United States Patent [19]
Hewison

[11] Patent Number: 4,966,024
[45] Date of Patent: Oct. 30, 1990

[54] METHOD OF FORMING A SCREW THREADED FASTENER

[75] Inventor: George D. Hewison, Twyford, Great Britain

[73] Assignee: ITW, Ltd., Surrey, England

[21] Appl. No.: 382,145

[22] Filed: Jun. 5, 1989

Related U.S. Application Data

[62] Division of Ser. No. 241,891, Sep. 8, 1988, Pat. No. 4,878,793.

[30] Foreign Application Priority Data

Sep. 8, 1987 [GB] United Kingdom ................ 8721048

[51] Int. Cl.⁵ .......................... B21H 3/02; B21D 17/04
[52] U.S. Cl. ........................................ 72/88; 10/10 R; 10/27 E
[58] Field of Search ............... 10/10 R, 27 R, 27 E, 10/140, 152 R, 153; 72/253, 256, 377, 88, 90; 408/117, 118, 119; 411/386, 387, 412, 413

[56] References Cited

U.S. PATENT DOCUMENTS

| | | | |
|---|---|---|---|
| 1,855,372 | 4/1932 | White | 10/27 E |
| 3,478,639 | 11/1969 | Gruca | 411/531 |
| 3,682,507 | 8/1972 | Waud | 411/413 |
| 3,683,436 | 8/1972 | Reiland | 10/10 R |
| 4,534,690 | 8/1985 | Barth | 10/10 R X |
| 4,621,963 | 11/1986 | Reinwall | 411/369 |
| 4,655,661 | 4/1987 | Brandt | 411/387 |
| 4,724,694 | 2/1988 | Medal | 10/10 R X |

FOREIGN PATENT DOCUMENTS

0267153  5/1988  European Pat. Off. ............ 411/387

Primary Examiner—E. Michael Combs
Attorney, Agent, or Firm—Schwartz & Weinrieb

[57] ABSTRACT

A screw threaded method of making fastener particularly intended for use in fastening corrugated sheet material to metal purlins comprises a drilling point (1), a head (2), a first self-tapping screw threaded portion (3) adjacent the drilling point (1), a second screw threaded portion (4) adjacent the head (2), the second screw threaded portion (4) having a larger crest diameter than the first screw threaded portion (3), and an unthreaded portion (5) extending between the first and second screw threaded portions. The diameter of the part of the fastener carrying the second screw threaded portion (4) is generally larger than that carrying the first screw threaded portion 3 and the fastener also includes a transition portion (6) between its portions of smaller and larger diameter, and in particular, interposed between the trailing edge portion of the first screw threaded portion (3) and the leading edge portion of the unthreaded portion (5). The transition portion (6) includes forming portions (8 FIG. 4) projecting outwardly from the axis of the fastener no further than the diameter of the larger diameter portion. The forming portion (8) in use, enlarge the diameter of a hole drilled within the sheet material by mean of the drilling point (1) so as to allow passage of the larger diameter portion of the fastener through the sheet material. Such a fastener is formed by mean of a forward extrusion step which reduces its diameter and which, simultaneously, forms the forming portions (8) upon the transition (6) portion.

22 Claims, 2 Drawing Sheets

METHOD OF FORMING A SCREW THREADED FASTENER

This application is a division of application Ser. No. 241,891, filed 9/8/88, U.S. Pat. No. 4,878,793.

FIELD OF THE INVENTION

The present invention relates generally to screw-threaded fasteners, and more particularly to self-tapping screw-threaded fasteners having first and second threaded portions axially separated by means of an unthreaded portion with the diameter of the second threaded portion being greater than that of the first threaded portion, and wherein a specially configured, hole-enlarging transition portion or zone is defined between the trailing end portion of the first threaded portion and the leading end portion of the unthreaded portion so as to permit passage of the second threaded portion through a component to be fastened to a support element.

BACKGROUND OF THE INVENTION

Our earlier patent specification GB-A-No. 1270545 describes and claims a screw threaded fastener which is particularly arranged for fixing a corrugated metal roofing sheet onto underlying metal purlins. The fastener includes a self-drilling point, a first self-tapping screw thread adjacent the drilling point, an unthreaded region, a head and a second screw threaded portion adjacent the head. In use, the drilling point firstly drills a hole within the corrugated sheet material and the first screw threaded portion forms a threaded region within through the sheet metal component. Then, with the sheet metal component within the vicinity of the unthreaded portion the drilling point drills a hole within the underlying purlin. Once this has been completed the first screw threaded portion cuts a thread within the underlying purlin and, as the fastener is screwed into the purlin the second screw thread engages the roofing sheet and urges it rearwardly so as to clamp it between the second screw threaded portion and the head of the fastener and of course any waterproof sealing washer interposed between the top of the roofing sheet and the head of the fastener. Such fasteners have been successful and used widely.

Our earlier patent specification No. GB-A-No. 1277044 describes an improvement of the fastener described in GB-A-No. 1270545 by fabricating the fastener by means of a process including two forward extrusion steps using three different punch tools so that the diameter of the fastener adjacent the head is greater than the diameter of the fastener adjacent the drill point. This enables the second screw threaded portion to have a larger diameter so that the crest diameter of the second-screw thread is much greater than that of the first screw thread. This provides a more positive engagement of the roofing sheet with the second screw threaded portion and so forms a more reliable seal between the head of the fastener and the roofing sheet. In order to provide clearance for the larger diameter portion of the fastener the process also includes a subsequent forging step during which wings are formed upon the shank of the fastener upstream of the trailing edge portion of the first screw thread. The wings firstly ream out the screw thread formed with the roofing sheet by means of the first screw threaded portion and provide an enlarged hole which allows insufficient clearance for the larger passage therethrough diameter portion of the fastener, and secondly, when and if they come into contact with the upper face of the purlin, they prevent overdriving of the fastener Forming the blanks for the fasteners so as to form the portions of larger diameter and also the subsequent forging operation so as to produce the upstanding wings leads to a production process on these fasteners which is expensive with the result that while the fasteners are technically superior they are more expensive to manufacture which makes it more difficult for them to compete in the market place with fasteners made in accordance with patent specification 1270545.

SUMMARY OF THE INVENTION

According to a first aspect of this invention a screw threaded fastener particularly intended for use in fastening corrugated sheet material to metal purlins and comprising a drilling point, a head, a first self-tapping screw threaded portion adjacent the drilling point, a second screw threaded portion adjacent the head, the second screw threaded portion having a larger crest diameter than that of the first screw threaded portion, and an unthreaded portion extending between the first and second screw threaded portions, the diameter of the portion of the fastener carrying the second screw threaded portion being generally larger than that carrying the first screw threaded portion and the fastener also including a transition portion between first screw threaded and unthreaded portions. is characterized by the transition portion including forming means which project outwardly from the axis of the fastener no further than the diameter of the larger diameter portion and which, in use, enlarges the diameter of the hole drilled within the sheet material by means of the drilling point so as to allow passage of the larger diameter portion of the fastener through the sheet material.

According to a second aspect of this invention a method of forming a screw threaded fastener particularly intended for use in attaching a corrugated roofing sheet to an underlying metal purlin includes the steps of forward extrusion of part of a fastener blank through a die which reduces its diameter and which, simultaneously, forms forming means upon a transition region defined between the smaller and larger diameter portions of the blank, performing forming operations so as to form a drill point at the free end of the smaller diameter portion of the blank and a head at the free end of the larger diameter portion of the blank, and thread rolling operations so as to form a first screw thread upon the smaller diameter portion of the blank adjacent the drilling point and a second screw thread having a larger crest diameter than that of the first screw thread upon the larger diameter portion of the blank adjacent the head.

With the arrangement in accordance with this invention the forming means at the transition region defined between the two diameters of the fastener is formed at the same time and by means of the same operation as that forming the two diameters of the fastener blank and this greatly simplifies the manufacturing operation for the fastener so as to produce a fastener which is technically as good as that described in GB-A-No. 1277044 and yet which can be manufactured as inexpensively as that described in GB-A-No. 1270545.

Preferably the transition zone is generally frusto-conical in shape and the forming means are defined by means of a projection which projects outwardly from the frusto-conical surface and has the form of a chordal segment cut from a diametrical slice through a hemisphere. Preferably more than one such projection is formed around the transition zone and the projections are arranged equi-angularly around the transition zone.

There can be a reduction in cross-sectional area as high as 70% between the smaller and larger diameter portions of the fastener if two dies are used and this can accordingly give rise to a corresponding increase in crest diameter of the second screw thread relative to that of the first screw thread. However, more usually, a reduction of cross-sectional area of approximately 30% is provided between the larger and smaller diameter portions of the fastener and this can be achieved within a single die by means of a single cold forward extrusion process. It is preferred that the unthreaded portion has a diametrical which is similar to that of the larger diameter threaded portion and, in this case, the transition zone is formed at the intersection between the first screw threaded portion and the unthreaded portion.

BRIEF DESCRIPTION OF THE DRAWINGS

A particular example of a fastener in accordance with this invention will now be described with reference to the accompanying drawings, in which.

DESCRIPTION OF PREFERRED EMBODIMENT

Figure 1:
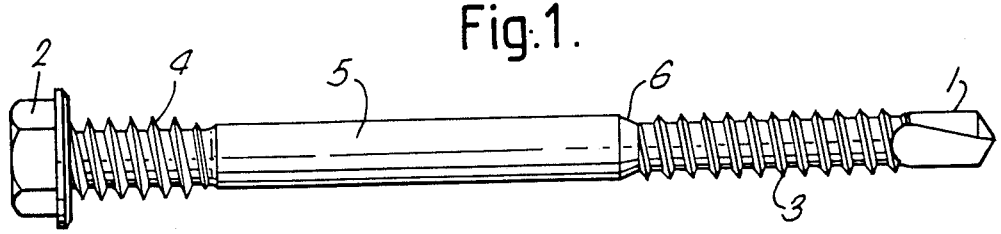
FIG. 1 is a side elevation of the fastener.
Figure 2:
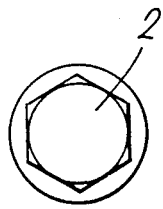
FIG. 2 is an end elevation showing the head of the fastener.

The fastener comprises a drilling tip 1 formed at one end and a head 2 at the other end, a first self-tapping screw thread 3 formed adjacent the drilling point 1 and a second screw thread 4 formed adjacent the head 2. An unthreaded portion 5 extends between the screw threads 3 and 4 and a transition portion 6 is located between the trailing end of the screw thread 3 and the unthreaded portion 5. The head 2, the second screw thread 4 and the unthreaded portion 5 are all formed from a portion of a screw blank having a large diameter of, for example 5.1 mm while the thread 3 and drilling point 1 are formed from a screw blank having a diameter of 4.55 mm.

Figure 3:
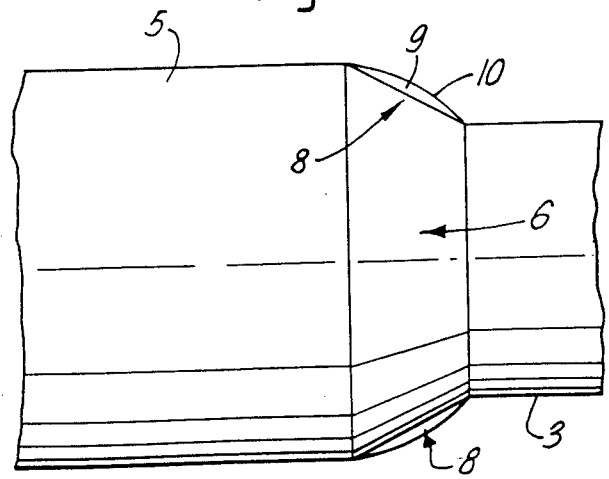
FIG. 3 is a side elevation drawn to a larger scale of the transition portion; and, FIG. 4 is a perspective view of the transition portion.

The transition portion 6 comprises a frusto-conical portion extending between the larger and smaller diameter portions of the fastener and two forming portions 8. The forming portions 8 include shoulders 9 and rounded faces 10. The forming portions 8 include rounded outer faces 10 and correspond to chordal segments of a diametrical slice through a hemisphere so that they are rounded both in a plane containing both segments and the axis of the fastener, as shown in FIG. 3 and are rounded in the circumferential sense.

In use such a fastener is intended to be used for attaching a corrugated sheet metal cover component to an underlying metal purlin. The drilling point 1 first drills a hole through the corrugated metal sheet and then the first screw thread 3 cuts a thread around the drilled aperture. Further forward movement and rotation of the fasteners urges the forming means 8 against the sidewalls of the aperture. The configuration of the forming means 8 rolls the corrugated sheet material downwardly as the transition portion 6 moves through the hole. This operation firstly enlarges the hole so as to allow the larger diameter unthreaded portion 5 of the fastener to penetrate the corrugated sheet and secondly provides an apparent thickening of the sheet material so as to ensure better engagement of the second screw thread 4 with the sheet material. Further rotation and forward movement of the fastener causes the drilling point 1, to drill through the purlin and then the screw thread 3 cuts a screw thread within the purlin as it is screwed into the purlin at the same time as the thread 4 engages the thickened region of the corrugated sheet.

Figure 4:
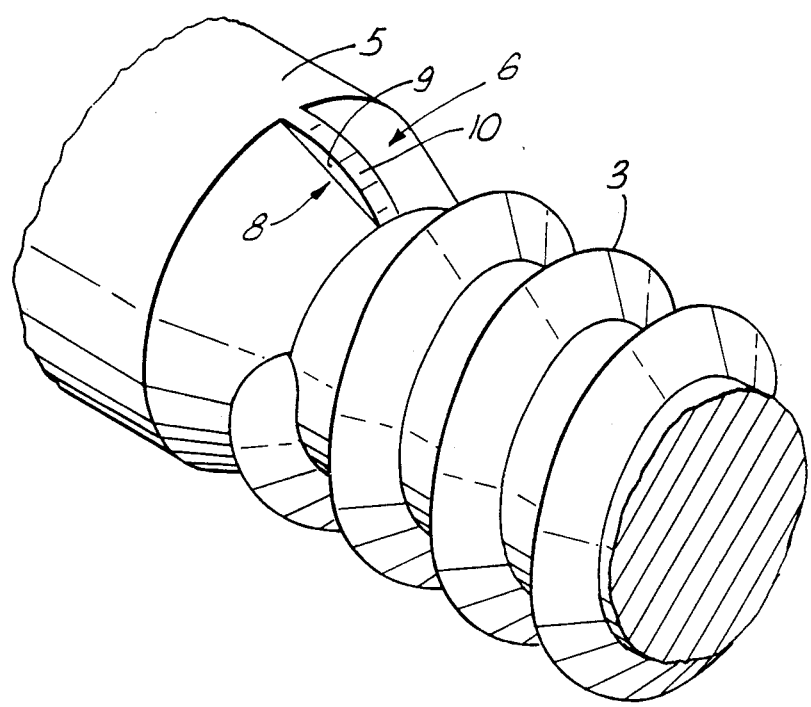

The fastener is fabricated by employing a blank having a diameter of 5.1 mm and subjecting this to a forward extrusion step so as to form the smaller diameter portion upon which the screw thread 3 and the drilling point 1 are formed. The blank is driven through a generally conical die having an input diameter of 5.1 mm and an exit diameter of 4.55 mm by a means of punch. The die includes a pair of diametrically opposed recesses having rounded bases formed by means of the cap having a sphere of substantially 5.1 mm. Thus the die has a shape which is the inverse of the shape of the transition region 6 shown in FIG. 4. Forward extrusion continues until the smaller diameter portion reaches an end stop. Further forward movement of the punch causes a further thickening of the larger diameter portion of the blank and so as to partly forms the head 2. A second punch then completes the thickening of the larger diameter portion and the head 2 while the blank is still contained within the same die. The drilling point 1 is then formed at the free end of the smaller diameter portion of the blank and screw threads 3 and 4 are rolled onto the blank. The blank is subsequently case hardened so as to complete the fastener. Preferably the second screw thread 4 has an included flank angle of 30° so as to increase still further its crest diameter.

Obviously, many modifications and variations of the present invention are possible in light of the above teachings. It is therefore to be understood that within the scope of the appended claims, the present invention may be practiced otherwise than as specifically described herein.

I claim:

1. A method of forming a screw threaded fastener particularly intended for use in attaching a corrugated roofing sheet to an underlying metal purlin, comprising the steps of:

forwardly extruding a part of a fastener blank, having a first predetermined diameter, through a die so as to reduce said first predetermined diameter to a second predetermined diameter, and to simultaneously form forming means upon an axially tapered transition portion defined between, and smoothly interconnecting, said first and second diameter portions of said blank;

performing forming operations upon said blank so as to form a drill point upon a free end of said second diameter portion of said blank, and a head upon a free end of said first diameter portion of said blank; and performing thread rolling operations upon said blank so as to form a first screw thread, having a first crest diameter, upon said first diameter portion of said blank adjacent to said head, and a second screw thread, having a second crest diameter which is less than said first crest diameter of said first screw thread, upon said second diameter portion of said blank adjacent to said drilling point such that a residual unthreaded blank portion is defined upon said first diameter portion of said blank so as to be interposed between said first screw thread portion and said tapered transition portion having said forming means formed thereon.

2. A method as set forth in claim 1, wherein:
a reduction of approximately 30% in cross-sectional area is achieved between said first and second diameter portions of said blank and within a single die by means of a single cold forward extrusion process.

3. A method as set forth in claim 1, wherein:
said blank has an initial diameter, comprising said first diameter portion, of approximately 5.1 mm.

4. A method as set forth in claim 2, wherein:
said die comprises a substantially conical die having an input diameter of approximately 5.1 mm and an exit diameter of approximately 4.55 mm.

5. A method as set forth in claim 1, further comprising the step of:
case hardening of said blank so as to complete formation of said fastener.

6. A method as set forth in claim 1, wherein:
said first screw thread adjacent to said head of said fastener has an included flank angle of approximately 30%.

7. A method as set forth in claim 1, wherein:
said first and second screw threads are separated by means of said unthreaded portion of said fastener.

8. A method as set forth in claim 7, wherein:
said transition portion is defined between said unthreaded portion and said second thread portion of said fastener.

9. A method as set forth in claim 1, wherein:
said transition portion is formed so as to have a substantially frusto-conical configuration; and
said forming means is formed so as to define at least one projection projecting radially outwardly from said frusto-conical surface of said transition portion.

10. A method as set forth in claim 9, wherein:
said forming means is formed such that said at least one projection has the form of a chordal segment cut from a diametral slice through a hemisphere.

11. A method as set forth in claim 9, wherein:
more than one of said projections is formed upon said transition surface and are disposed equiangularly around said transition portion.

12. A method as set forth in claim 7, wherein:
said unthreaded and second screw threaded portions of said fastener comprise cylindrical structures having circular configurations as seen in radially extending planes.

13. A method as set forth in claim 7, wherein:
the radially outward extend of said forming means does not exceed any radially outward dimension of said unthreaded portion of said fastener.

14. A method as set forth in claim 11, wherein:
said projections are located upon diametrically opposed portions of said transition portion.

15. A method of forming a screw threaded fastener, particularly intended for use in fastening corrugated sheet material to metal purlins, comprising the steps of:
forming a drilling point upon one end of a fastener blank;
forming a head portion upon an opposite second end of said fastener blank;
forming a first self-tapping screw threaded portion adjacent to said drilling point and upon a first portion of said fastener blank having a first predetermined diameter;
forming a second screw threaded portion adjacent to said head portion and upon a second portion of said fastener blank having a second predetermined diameter which is greater than said first predetermined diameter of said first screw threaded portion, said second screw threaded portion being axially separated from said first screw threaded portion by means of an unthreaded portion which has a diametrical extend which is substantially equal to said second predetermined diameter of said second fastener blank portion and which is therefore greater than said diameter of said first fastener blank portion;
forming a transition portion upon said fastener blank between said first screw threaded portion and said unthreaded portion so as to smoothly interconnect said first screw threaded portion, having said first predetermined diametrical extent, with said unthreaded portion having said second predetermined diametrical extent; and
forming forming means upon said transition portion so as to project substantially radially outwardly from external surface portions of said transition portion so as to enlarge the diameter of a hole drilled within said sheet material by said drilling point and thereby facilitate the passage of said unthreaded and second screw threaded portions of said fastener through said sheet material.

16. A method as set forth in claim 15, wherein:
said unthreaded and first screw threaded portions of said fastener are formed as cylindrical structures having circular configurations as seen in radially extending planes.

17. A method as set forth in claim 15, wherein:
each of said first and second screw threaded portion has a screw crest diameter with the diametrical extent of said screw thread crest diameter of said second screw threaded portion being greater than the diametrical extent of said screw thread crest diameter of said first screw threaded portion.

18. A method as set forth in claim 15, wherein:
the radially outward extent of said forming means does not exceed any radially outward dimension of said unthreaded portion of said fastener.

19. A method as set forth in claim 15, wherein:
said projecting forming means are formed upon diametrically opposed portions of said transition portion.

20. A method as set forth in claim 15, wherein:
said forming means are formed upon said transition portion so as to be equiangularly disposed about said transition portion.

21. A method as set forth in claim 15, wherein:
said transition portion is substantially frusto-conical in configuration.

22. A method as set forth in claim 15, wherein:
said forming means are formed as chordal segments cut from a diametrical slice through a hemisphere.

* * * * *